(12) United States Patent
Schläfer et al.

(10) Patent No.: US 7,445,664 B2
(45) Date of Patent: Nov. 4, 2008

(54) DESUBLIMATOR FOR ALUMINUM CHLORIDE

(75) Inventors: Dieter Schläfer, Ludwigshafen (DE); Hans-Ulrich Schlimper, Dudenhofen (DE)

(73) Assignee: BASF Aktiengesellschaft (DE)

( * ) Notice: Subject to any disclaimer, the term of this patent is extended or adjusted under 35 U.S.C. 154(b) by 549 days.

(21) Appl. No.: 11/225,418

(22) Filed: Sep. 13, 2005

(65) Prior Publication Data

US 2006/0070522 A1 Apr. 6, 2006

(30) Foreign Application Priority Data

Sep. 16, 2004 (DE) ................ 10 2004 044 934

(51) Int. Cl.
*B01D 53/00* (2006.01)
(52) U.S. Cl. .......................... 95/290; 62/637
(58) Field of Classification Search .............. 95/290; 62/637
See application file for complete search history.

(56) References Cited

FOREIGN PATENT DOCUMENTS

JP          08243301 A    *  9/1996

* cited by examiner

*Primary Examiner*—Robert A Hopkins
(74) *Attorney, Agent, or Firm*—Connolly Bove Lodge & Hutz LLP

(57) ABSTRACT

The invention relates to a desublimator for producing particulate, solid aluminum chloride from aluminum chloride vapor, which is formed by a vessel which is closed on all sides and has vertical walls and a feed point for the aluminum chloride vapor and an offtake point for the solid aluminum chloride, wherein the walls of the vessel are formed by flat metal sheets which are welded into a rigid frame so that they can be set into vibration by being struck with a tapper.

15 Claims, 3 Drawing Sheets

DESUBLIMATOR FOR ALUMINUM CHLORIDE

Figure 1:
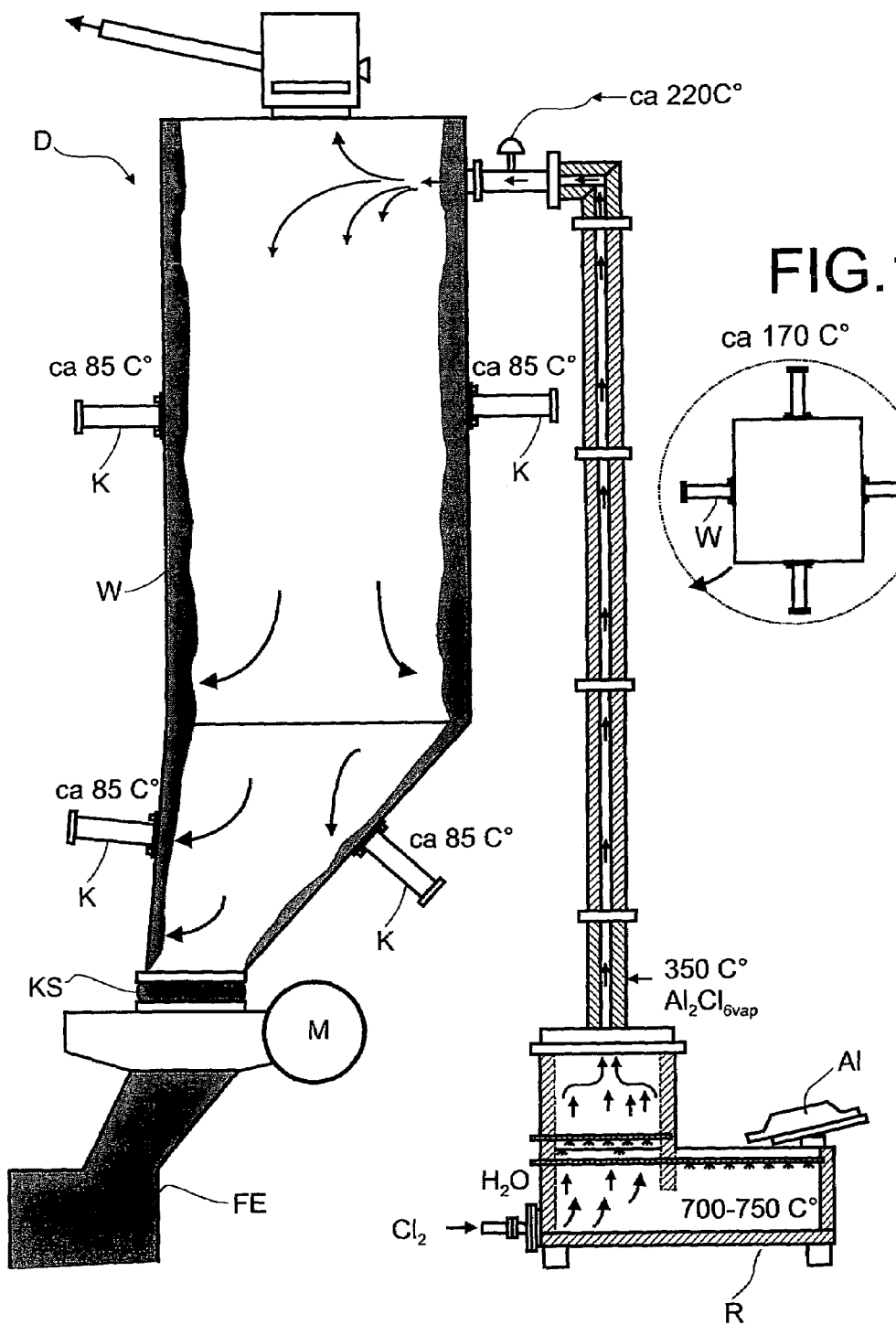

The invention relates to a desublimator for producing particulate, solid aluminum chloride from aluminum chloride vapor.

Aluminum chloride is prepared industrially by synthesis from the elements using molten aluminum and chlorine. The reaction takes place at about 700-750° C. and is strongly exothermic. In industry, the reaction is frequently carried out in relatively small synthesis units having capacities in the range from about 80 to 100 kg/h.

The aluminum chloride formed is gaseous under the reaction conditions, since aluminum chloride sublimes as a dimer at temperatures above 180° C. The aluminum chloride vapor goes via a pipe into an air-cooled vessel, viz. a desublimator, in which the aluminum chloride deposits in solid form, preferably on the walls.

In apparatuses according to the prior art, the vessels used as desublimators have a cylindrical geometry having a circular cross section, with the wall of the cylinder forming an oblique cone at its lower end.

To clean off the solid aluminum chloride deposited on the walls, pneumatic tappers are installed on the outside of the desublimator.

In operation, it has been found that due to the rigid vessel geometry, the effect of the tappers extends only to a limited distance from the point of impact, so that caking continues to recur at parts of the wall to which the effect does not extend.

This caking can be induced to fall off only manually, by external hammering, or has to be removed by means of costly cleaning using pneumatic hammers. This extreme case means shutdown of the entire synthesis unit.

A further disadvantage of the additional manual cleaning by means of hammers is unavoidable deformation of the desublimator by formation of dents, which greatly increases the rigidity of the apparatus and leads to mechanical stressing of the wall material as far as crack formation.

It was therefore an object of the invention to provide a desublimator which does not have the disadvantages of the prior art and, in particular, does not require manual action to detach the solid aluminum chloride from the walls.

This object is achieved by a desublimator for producing particulate, solid aluminum chloride from aluminum chloride vapor, which is formed by a vessel which is closed on all sides and has vertical walls and a feed point for the aluminum chloride vapor and an offtake point for the solid aluminum chloride, wherein the walls of the vessel are formed by flat metal sheets which are welded into a rigid frame so that they can be set into vibration by being struck with a tapper.

It has been found that it is quite critical to the detachment of the solid aluminum chloride formed by desublimation from the walls of the desublimator that the walls are very flat and, in addition, are configured so that they behave like vibrating membranes when subjected to an impact.

For the specific selection of the materials class in respect of the flatness, particular preference is given, owing to the above relationships, to the highest tolerance class in accordance with DIN EN ISO 13920, viz. the tolerance class E. For economic considerations, the tolerance class F can also be chosen.

A material conforms to the tolerance class E in accordance with DIN EN ISO 13920 if, for example, it does not exceed a tolerance t of 3 mm in the nominal dimension range 1 of from >2000 to 4000 mm. In the lower tolerance class F, the tolerance t for the same nominal dimension range is 6 mm.

Metal sheets having flatnesses in the above tolerance ranges can preferably be obtained by point welding, in particular by the flame leveling method. Information on this may be found, for example, in Richard Pfeiffer: Handbuch der Flammrichttechnik: Metallurgie, Verfahren, Geräte und Anwendungsbeispiele, Deutscher Verlag für Schweißtechnik DVS-Verlag, Düsseldorf, 1996, where, on page 2, item 1.2.1, flame leveling is, with reference to the Stahl-Eisen-Werkstoffblatt SEW 088, defined as follows: "Flame leveling is rapid and local heating of a component for a short time to a flame leveling temperature with the aim of imparting a desired shape to the component or eliminating deformations. Heating can be restricted to the region close to the surface or can go right through. The flame leveling temperature is the highest temperature occurring in the component during the flame leveling procedure".

As material for the metal sheets forming the walls, preference is given to a fine-grained structural steel, in particular the fine-grained structural steel P 355 NH. The preferred thickness of material for the walls is 5 or 6 mm.

The vertical walls of the desublimator form the side faces of a prism, preferably a prism having a square base.

The metal sheets forming the walls are welded into a rigid frame in such a way that they can be set into vibration by being struck with a tapper.

The metal sheets are preferably welded into the frame by welding methods which introduce little heat and accordingly cause little or no change in the microstructure and little or no undercutting. An example of such a process is the tungsten inert gas process (TIG process).

The welding seams are preferably ground flush with the metal sheet in the interior of the vessel and made with little indentation on the outside of the vessel.

The frame has corner angles which are advantageously formed cold on a bending bench and subsequently annealed at 580° C. to leave low residual stresses.

The desublimator itself is not rigid, but is, in particular, suspended via rubber buffers; likewise, the connection line for taking off the solid aluminum chloride from the desublimator at the lower end of the desublimator is not fastened rigidly, but via compensators.

To make it easier to take off the product, the desublimator preferably forms a cone at the lower end of the part having vertical walls, particularly preferably forms a slanted cone.

The cone is advantageously configured according to the same construction principle as the parts having vertical walls, i.e. as a rigid frame construction with lateral parts which can be set into vibration welded onto it.

The desublimator can advantageously be made up of three parts, i.e. two superposed prismatic components which are of identical construction and have vertical walls and a lower, conical section, with the components being connected to one another by means of flanges.

The flat metal sheets forming the side faces of the desublimator are set into vibration by means of an impact, in particular using pneumatic tappers. Smoother operation of the desublimator can in general be achieved using the just one tapper on each flat metal sheet. The tappers are advantageously mounted on tapper mounts which are constructed in one piece, i.e. made completely without welding seams, in particular milled from round stock and likewise fastened to the outer walls of the desublimator without welding seams, preferably by means of screws.

The invention is illustrated below with the aid of a drawing and an example.

Figure 2:
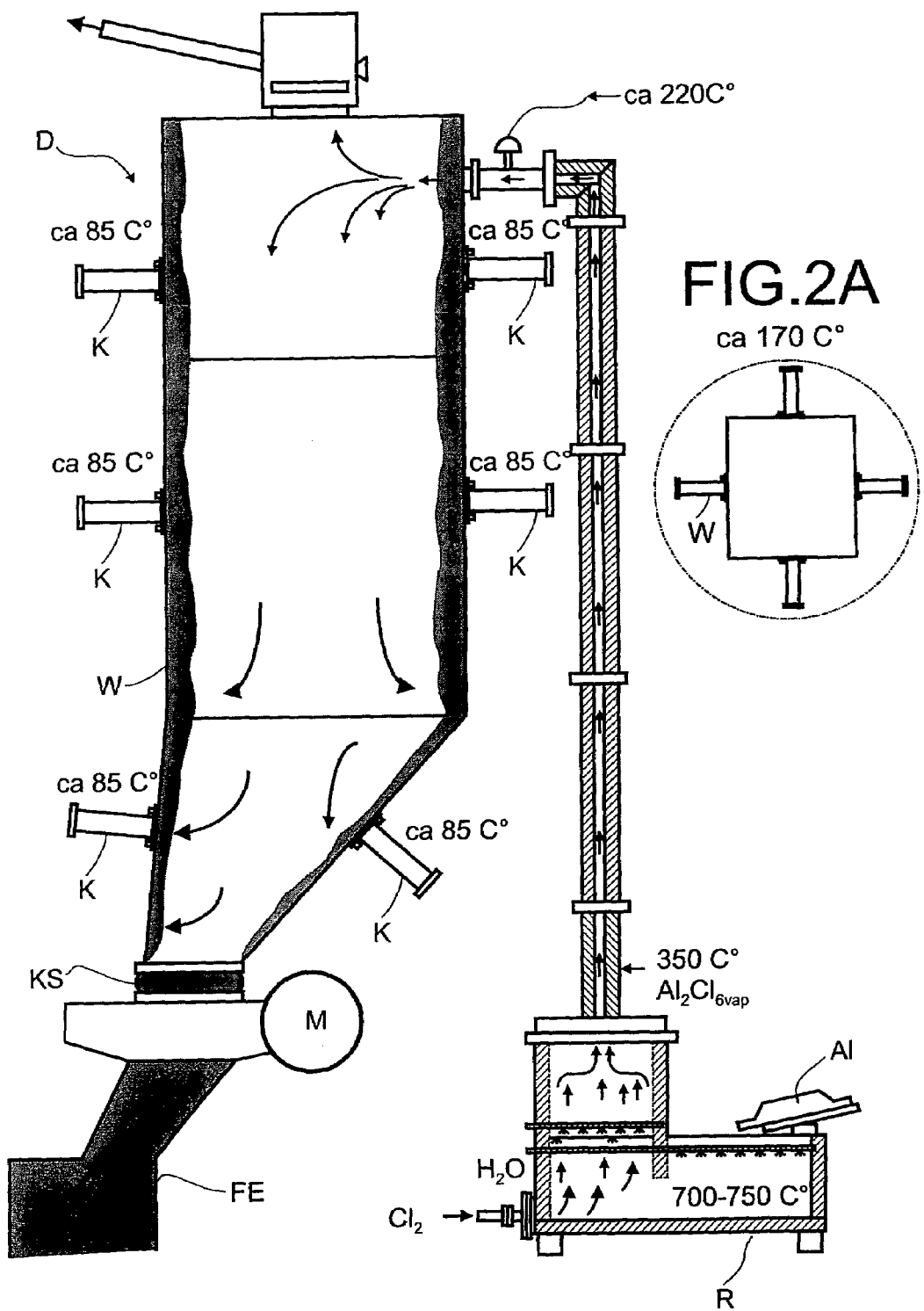
Figures 3, 3A:
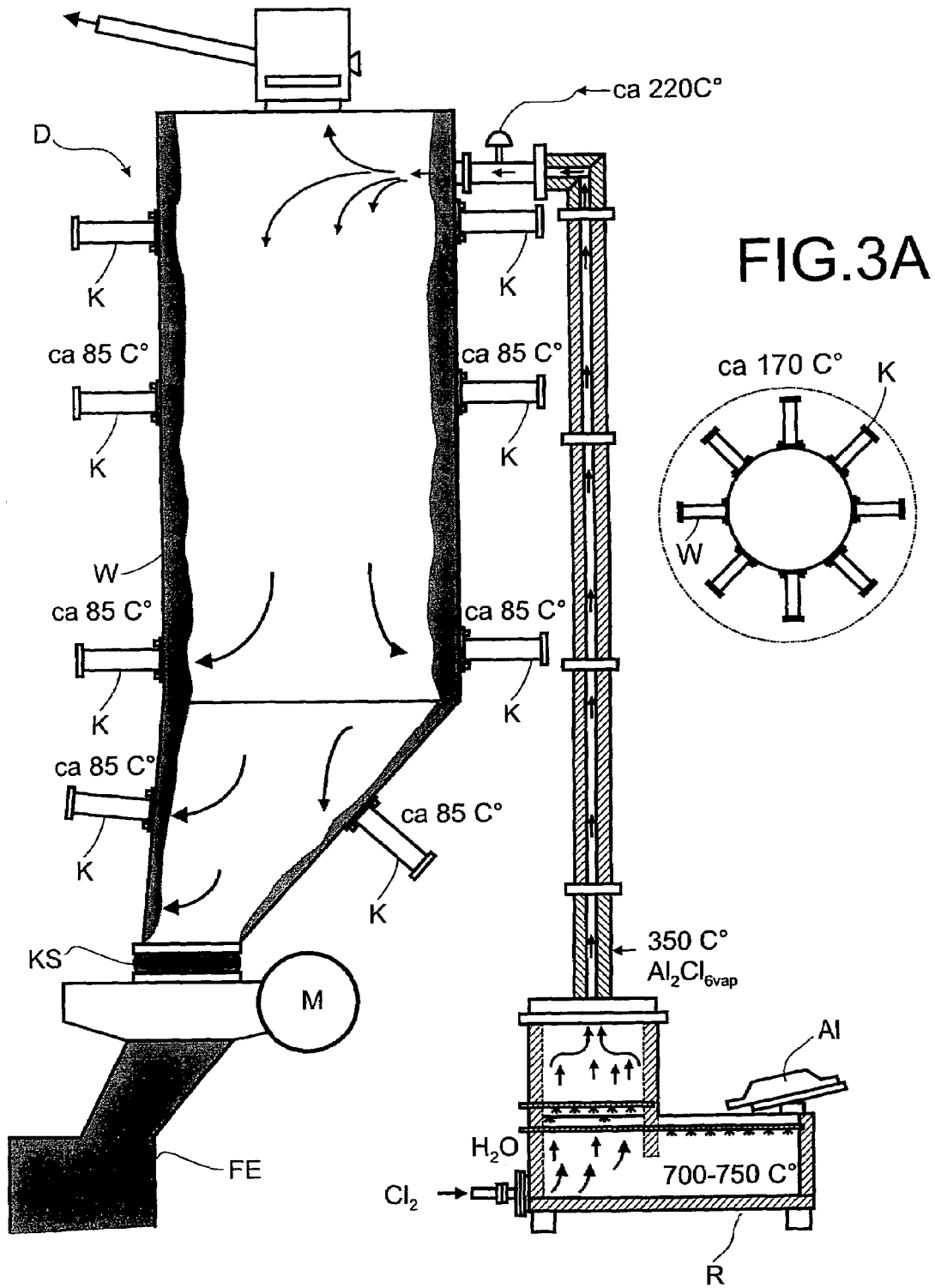

In detail:

FIG. 1 schematically shows a preferred embodiment of a desublimator according to the invention, with the cross section depicted in FIG. 1A, FIG. 2 schematically shows a further preferred embodiment of a desublimator according to the invention, with the cross section depicted in FIG. 2A, and FIG. 3 schematically shows a desublimator according to the prior art, with the cross section depicted in FIG. 3A.

In the drawing, identical reference numerals denote identical or corresponding components.

FIG. 1 schematically shows a synthesis reactor R in which aluminum bars Al are to be melted to form an aluminum bath (bath temperature: 700-750° C.). A stream of gaseous chlorine ($Cl_2$) is passed into the aluminum bath in the lower region of the bath. Synthesis from the elements forms aluminum chloride which is gaseous under the reaction conditions and is cooled with water and conveyed as dimer ($Al_2Cl_{6vap}$) at about 350° C. via an offtake line into the desublimator. The aluminum chloride vapor cools to about 220° C. in the offtake line by the time it enters the desublimator. In the preferred embodiment depicted in the figure, the inlet into the desublimator is positioned in the upper region of the desublimator.

The desublimator D is a vessel which is closed on all sides by vertical walls W and forms a slanted cone in its lower region. A safety valve and an offtake for the exhaust air are provided in the lid at the top of the vessel.

The lower, conical part of the desublimator D is connected via a compensator K and a motor M to a transport unit FE, preferably a chain trough conveyer.

A tapper K is installed on each of the walls W of the desublimator D by means of a screw connection.

The cross section depicted in FIG. 1A clearly shows the square cross section of the part of the vessel having vertical walls W.

FIG. 2 schematically shows a further preferred embodiment of a desublimator D which, as a difference from the embodiment depicted in FIG. 1, is made up of three parts, i.e. comprising two prismatic components which have vertical walls W and are located above one another and are connected by means of flanges, with the lower component forming an oblique cone. In contrast to the embodiment in FIG. 1 provided with a total of 8 tappers, this three-part embodiment is provided with a total of 12 tappers, i.e. 1 tapper per wall.

In the schematic depiction of a desublimator according to the prior art in FIG. 3, it can immediately be seen that a larger number of tappers K is necessary.

The important difference from the invention is shown by the cross section depicted in FIG. 3A which clearly shows the circular cross section of the vessel with vertical walls and also the significantly larger number of tappers.

EXAMPLES 1. according to the prior art

A typical desublimator according to the prior art is a vessel in the form of a straight, vertical cylinder which has a length of 4.30 m and a circular cross section having a diameter of 1.60 m and is adjoined in its lower region by a slanted cone having a length of 2.34 m. The desublimator is constructed of structural steel STE 355 having a material thickness of 5 mm.

To clean the product from the interior walls of the desublimator, a total of 23 pneumatic tappers are installed on the outer walls and are distributed over the surface as follows: 16 tappers on the straight cylinder and 7 tappers on the cone.

In operation, it has been found that the walls cannot be cleaned off by sole action of the pneumatic tappers. Additional manual hammering is absolutely necessary, and in an extreme case cleaning has to be carried out using compressed air hammers. The desublimators display severe denting with the risk of crack formation due to the hammering action.

2. according to the invention

In contrast, a desublimator according to the invention having the same capacity was constructed as a vertical cuboid having a square cross section, a side length of the cross section of 1.36 m and an edge length of the cuboid of 4.323 m, adjoined by a slanted conical section having a length of 2.457 m. The cuboidal part and the conical part of the vessel were both made of flat sheets of structural steel STE 355 having a material thickness of 6 mm and a flatness corresponding to the tolerance class F in accordance with DIN EN ISO 13920, each welded into a rigid frame by the tungsten inert gas method. The internal volume of the desublimator of 10.68 $m^3$ corresponded approximately to the internal volume of the desublimator according to the prior art (10.50 $m^3$).

A single pneumatic tapper was installed on the outer wall of each flat sheet to be cleaned off. The total number of tappers on the desublimator was accordingly 8, i.e. 4 tappers on the vertical side walls of the square section of the vessel and 4 tappers on the side walls of the conical lower section.

In operation, it was found that the tappers in each case set the entire area of the wall into vibration as a result of the impact acting on the area, which leads to the product precipitated on the wall falling off.

Even after experimental operation for a number of years, no additional manual cleaning by means of external hammering was necessary in addition to the action of the pneumatic tappers.

Furthermore, it has been found that even in the case of an extraordinarily thick layer on the walls as a result of failure of tappers, the product was able to be removed mechanically exclusively by prolonging the tapping times without manual action.

The advantages of the desublimator type according to the invention are thus in the exclusively mechanical cleaning-off without manual cleaning-off being necessary, so that no damaging deformation occurs, the maintenance requirements are reduced and continuous operation of the synthesis unit is thus improved. In addition, the costs of installation and operation of the pneumatic tappers is reduced as a result of the significantly reduced number of these.

The invention claimed is:

1. A desublimator for producing particulate, solid aluminum chloride from aluminum chloride vapor, which is formed by a vessel which is closed on all sides and has vertical walls and a feed point for the aluminum chloride vapor and an offtake point for the solid aluminum chloride, wherein the walls of the vessel are formed by flat metal sheets which are welded into a rigid frame so that they can be set into vibration by being struck with a tapper.

2. The desublimator according to claim 1, wherein the vessel which is closed on all sides forms a cone in its lower region.

3. The desublimator according to claim 1, wherein the flatness of the metal sheets forming the walls conforms to the tolerance class F in accordance with DIN EN ISO 13920.

4. The desublimator according to claim 3, wherein the flatness of the metal sheets forming the walls is produced by point welding.

5. The desublimator according to claim 1, wherein the flat metal sheets form the side faces of a prism.

6. The desublimator according to claim 1, wherein the frame into which the flat metal sheets are welded has corner angles which are annealed so as to leave low residual stresses after shaping.

7. The desublimator according to claim 1, wherein the material for the flat metal sheets is a fine-grained structural steel and the thickness of the metal sheets is 5 or 6 mm.

8. The desublimator according to claim 1, wherein the flat metal sheets have a welding seam welded flush with the metal sheet in the interior of the vessel and made with little indentation on the outside of the vessel.

9. The desublimator according to claim 1 which is made up of three parts, namely two superposed prismatic components and a lower, conical section.

10. The desublimator according to claim 1, wherein tappers which set the walls of the desublimator into vibration by means of an impact are mounted on tapper mounts which are made in one piece and are screwed onto the walls of the desublimator.

11. The desublimator according to claim 2, wherein the cone in the lower region of the vessel is slanted.

12. The desublimator according to claim 3, wherein the flatness of the metal sheets forming the walls conforms the tolerance class E in accordance with DIN EN ISO 13920.

13. The desublimator according to claim 5, wherein the prism has a square base.

14. The desublimator according to claim 7, wherein the material for the flat metal sheets is fine-grained structural steel P 355 NH.

15. The desublimator according to claim 9, wherein the two superposed prismatic components have an identical construction.

\* \* \* \* \*